United States Patent Office.

SOLOMON GRADENWITZ, OF NEW YORK, N. Y., ASSIGNOR TO B. OLLENDORFF, OF SAME PLACE.

Letters Patent No. 90,443, dated May 25, 1869.

IMPROVED COMPOSITION FOR MAKING IMITATION IVORY, WOOD, HORN, &c.

The Schedule referred to in these Letters Patent and making part of the same.

*To all whom it may concern:*

Be it known that I, SOLOMON GRADENWITZ, of the city, county, and State of New York, have invented a new an improved Composition for Making Imitation Ivory, Wood, and other similar articles; and I do hereby declare that the following is a full, clear, and exact description thereof, which will enable others skilled in the art to make and use the same.

This invention relates to a new composition for making imitation ivory, wood horn, jet, or other similar substances, in such a manner that the same can be moulded and formed into any suitable shape, or that it may be allowed to harden, so that it can be shaped, turned, sawed, or cut in the same manner as, and with instruments similar to those with which wood is shaped.

The composition for making the imitation ivory, I compound of the following ingredients, in about the proportions and substantially in the manner subjoined:

I take about eighty (80) parts, by weight, of china-clay, thirty-two (32) parts, by weight, of precipitated chalk, sixteen (16) parts, by weight, of white lead, and thirty-two (32) parts, by weight, of gelatine. The latter is first dissolved in boiling water, and brought to about the consistency of sirup. About one (1) part of Venetian turpentine (frequently termed turpentine sirup) is then added to it, to increase the elastic properties of the compound, and one part of linseed-oil, to make the whole appear glossy. The first four ingredients are then mixed with the so-prepared gelatine, and the whole mixture is then brought to such a consistency that it can be moulded to any desired form or shape. It will then harden to about the consistency of wood, and can be worked, in the hardened state, into the desired form, if desired.

To make the composition imitate horn, jet, or other material, it need only be mixed with a coloring-matter of the desired shade, and be coated with varnish, to increase its gloss, and to preserve it from the effects of the weather and other deleterious agencies.

To make the composition imitate wood, I retain the aforesaid ingredients, and their proportions, with the exception of the gelatine, in place of which common glue is to be used, which is to be treated with Venetian turpentine and linseed-oil, as has been described for the gelatine. To the composition are then added about sixty-four (64) parts of sawdust, of such wood which the composition is to imitate. The sawdust is ground to an impalpable powder, and is well mixed with the composition, which will, when hardened, be an almost exact imitation of that kind of wood of which the sawdust was made.

Should it be necessary to increase or diminish the weight of the composition, so as to bring it, in that respect also, near to the article which it is to represent, a little more of the white lead may be added, or some of it may be left off, and, instead of it, more sawdust be added.

Having thus described my invention,

What I claim as new, and desire to secure by Letters Patent, is—

1. A composition for making imitation ivory, wood, jet, horn, and other similar articles, which is compounded of the materials, in about the proportions, and substantially in the manner herein set forth.

2. Grinding sawdust to an impalpable powder, and adding it to pasty substances, to make them appear like wood, as set forth.

SOLOMON GRADENWITZ.

Witnesses:
WM. F. MCNAMARA,
ALEX. F. ROBERTS.